(12) United States Patent
Ichinose et al.

(10) Patent No.: US 6,584,841 B1
(45) Date of Patent: Jul. 1, 2003

(54) ANGULAR RATE SENSOR

(75) Inventors: Toshihiko Ichinose, Nara (JP); Motoki Ogata, Fukui (JP); Junichi Yukawa, Nara (JP); Koji Yamamoto, Fukui (JP); Masahiro Saito, Osaka (JP); Takeshi Uemura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/554,014

(22) PCT Filed: Sep. 9, 1999

(86) PCT No.: PCT/JP99/04897

§ 371 (c)(1),
(2), (4) Date: Jul. 5, 2000

(87) PCT Pub. No.: WO00/16042

PCT Pub. Date: Mar. 23, 2000

(30) Foreign Application Priority Data

Sep. 10, 1998 (JP) ............................................. 10-256536

(51) Int. Cl.[7] .................................................. G01P 9/04
(52) U.S. Cl. .................................. 73/504.12; 73/504.16
(58) Field of Search ......................... 73/504.16, 504.15, 73/504.12, 504.04, 504.02, 504.03, 1.77, 1.37; 310/329, 370, 316, 317; 340/670, 671

(56) References Cited

U.S. PATENT DOCUMENTS

| | | | |
|---|---|---|---|
| 4,671,112 A | 6/1987 | Kimura et al. ................. 73/505 |
| 4,791,815 A | * 12/1988 | Yamaguchi et al. ...... 73/504.16 |
| 5,293,779 A | 3/1994 | Nakamura et al. ............. 73/505 |
| 5,719,460 A | 2/1998 | Watarai et al. ................. 73/505 |
| 5,939,630 A | * 8/1999 | Nozoe et al. .................. 73/1.77 |
| 6,029,516 A | * 2/2000 | Mori et al. ................ 73/504.12 |
| 6,044,706 A | * 4/2000 | Roh ......................... 73/504.12 |
| 6,220,094 B1 | * 4/2001 | Ichinose et al. .......... 73/504.16 |

FOREIGN PATENT DOCUMENTS

| | | |
|---|---|---|
| EP | 0490244 | 6/1992 |
| EP | 0834719 | 4/1998 |
| GB | 2262343 | 6/1993 |
| JP | 63-181912 | 11/1988 |
| JP | 02-310419 | 12/1990 |
| JP | 4-215017 | 8/1992 |
| JP | 05-264279 | 10/1993 |
| JP | 5-264279 | 10/1993 |
| JP | 6-18267 | 1/1994 |
| JP | 06-018267 | 1/1994 |
| JP | 6-148231 | 5/1994 |
| JP | 6-207946 | 7/1994 |
| JP | 6-241812 | 9/1994 |
| JP | 9-145377 | 6/1997 |
| JP | 9-257489 | 10/1997 |
| JP | 10-38580 | 2/1998 |

OTHER PUBLICATIONS

International Search Report corresponding to application No. PCT/JP99/04897 dated Oct. 19, 1999 (w/English Translation).

Y. Yoshino et al. "Yaw Rate Sensor", Journal of Nippondenso Engineering Society, vol. 38, No. 3, pp. 26–33 (1994).

* cited by examiner

Primary Examiner—Helen Kwok
(74) Attorney, Agent, or Firm—RatnerPrestia

(57) ABSTRACT

An angular rate sensor is characterized by having electrodes constituting an exciting unit for providing a vibrator with vibration, an electrode constituting a means for detecting a vibration level of the vibrator, an electrode constituting a first detection means for detecting Coriolis' force generated responsive to an angular rate, a second detecting electrode for detecting a signal of reverse polarity to that of the first detecting electrode, a driving circuit for taking as an input a signal from the electrode for detecting the vibration level and outputting a signal to the electrodes, and a first detection circuit and a second detection circuit for taking respective inputs of detected signals from the first detecting electrode and the second detecting electrode.

3 Claims, 6 Drawing Sheets (a)

(b)

ANGULAR RATE SENSOR

This application is a U.S. National Phase Application of PCT International Application PCT/JP99/04897.

1. Field of the Invention

The present invention relates to an angular rate sensor.

2. Background of the Invention

As a known angular rate sensor of the prior art, there is disclosed one in page 26 through page 33 of the Journal of Nippondenso Engineering Society (Vol. 38, No. 3, 1994). This angular rate sensor comprises an exciting unit for providing a tuning fork vibrator with vibration, a means for detecting a vibration level of the vibrator, a detection means for detecting Coriolis' force generated responsive to an angular rate, a first amplifier for amplifying an output signal of the means for detecting vibration level, a rectifier circuit for rectifying an output signal of the first amplifier to obtain a DC voltage, a comparator of an output voltage of the rectifier circuit with a reference voltage, and a variable gain amplifier connected to the exciting unit in a manner that a vibrating amplitude of the tuning fork vibrator is controlled to be constant by varying an amplification factor for amplifying a voltage, which is produced by shifting phase of an output voltage of the first amplifier by 90 degrees according to an output voltage of the comparator.

The prior art technique described above has not been sufficient to ensure reliability of the angular rate sensor, as it is difficult to make a detection when there is an open circuit in a connecting line between a detecting electrode and a detection circuit, a change in sensitivity due to deterioration of the detecting electrode, or a breakdown developed in the detection circuit.

SUMMARY OF THE INVENTION

An angular rate sensor includes an exciting unit for providing a vibrator with vibration a means for detecting a vibration level of the vibrator, a first detection means for detecting Coriolis' force generated responsive to an angular rate, a second detection means for detecting a signal of a reverse polarity to that of the first detection means, a driving circuit for taking as an input a signal from the means for detecting vibration level and outputting a signal to the exciting unit, and a first detection circuit and at second detection circuit wherein detected signals are being input respectively from the first detection means and the second detection means. A structure as described above is able to realize the angular rate sensor having a function of detecting even a change in sensitivity due to a breakdown and deterioration, with remarkably improved reliability.

DESCRIPTION OF THE PREFERRED EMBODIMENTS

First Exemplary Embodiment

Figure 1:
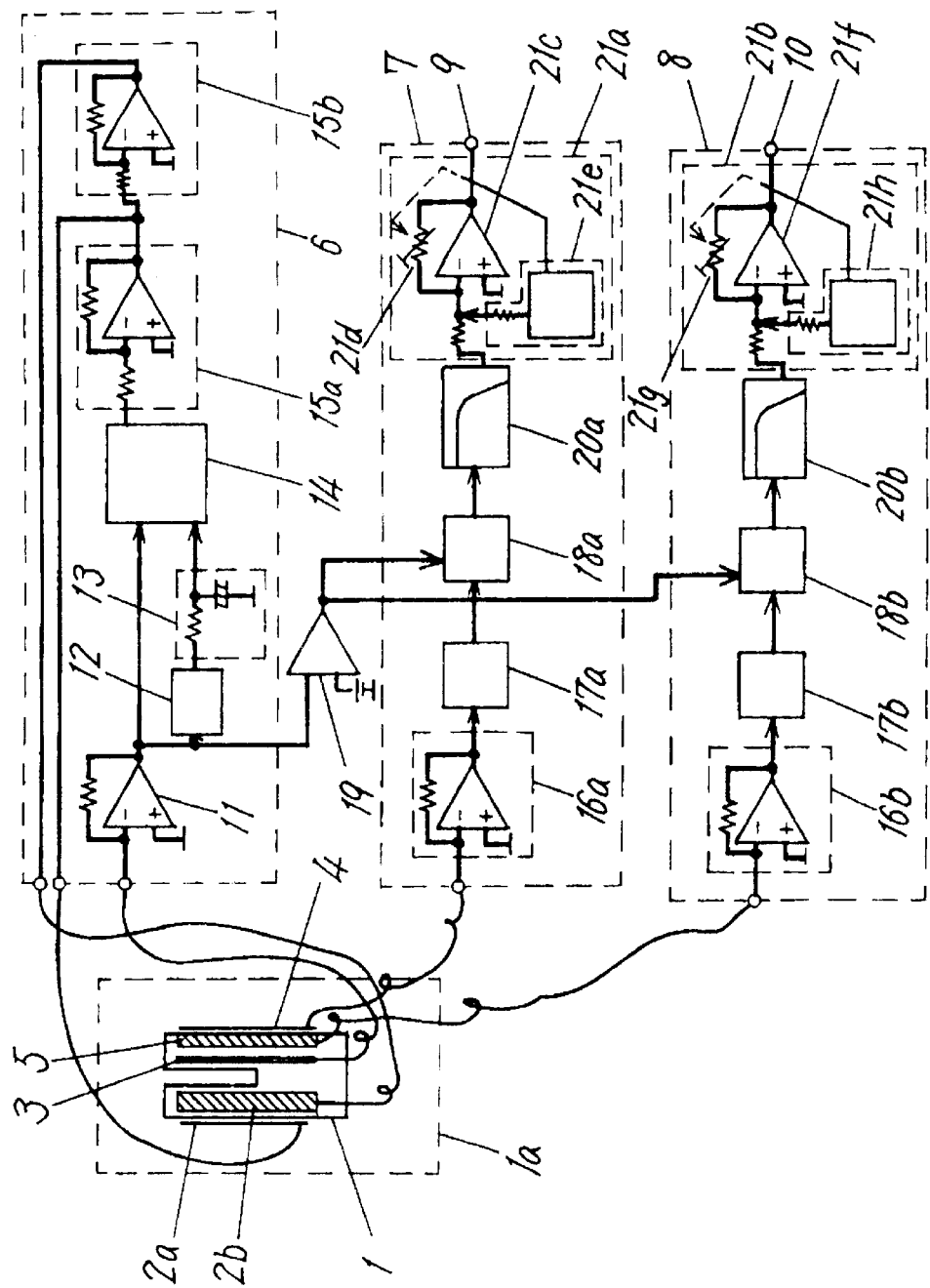
FIG. 1 is a block diagram of an angular rate sensor of a first exemplary embodiment of the present invention.
Figure 2:
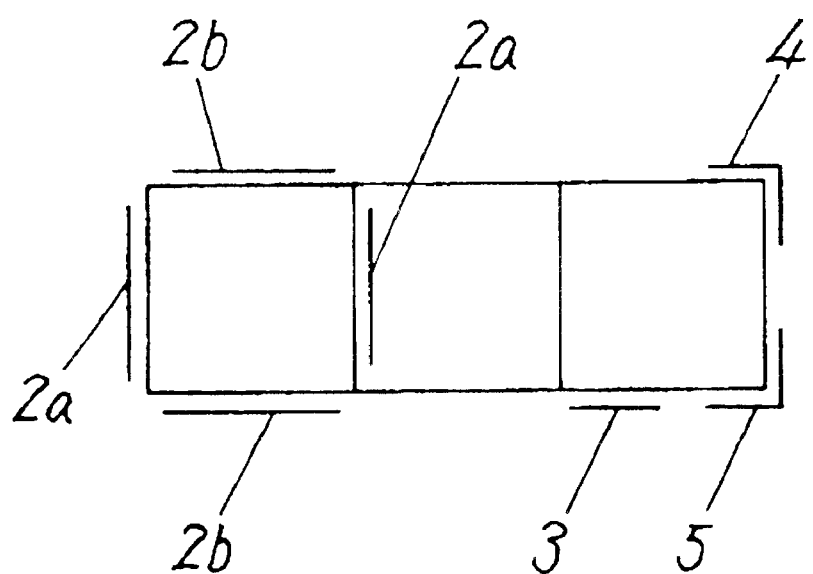
FIG. 2 is a plain view depicting an electrode arrangement of an angular rate sensor element block of the same first exemplary embodiment.

FIG. 1 is a block diagram of an angular rate sensor of a first exemplary embodiment of the present invention. FIG. 2 is a plan view that depicts in detail an electrode arrangement of an angular rate sensor element block of the first exemplary embodiment of the present invention. Referring to FIG. 1 and FIG. 2, designated at a numeral 1 is a tuning fork vibrator of the angular rate sensor, composed of a crystal, characters 2a and 2b are electrodes formed on the tuning fork vibrator 1 to constitute an exciting unit, a numeral 3 is another electrode formed on the tuning fork vibrator 1 to constitute a means for detecting a vibration level of the tuning fork vibrator 1, numerals 4 and 5 are a first detecting electrode for detecting Coriolis' force generated responsive to an angular rate, and a second detection electrode for detecting a signal of a reverse polarity to that of the first detection electrode, both formed on the tuning fork vibrator 1 to constitute detection means, a numeral 6 is a driving circuit, numerals 7 and 8 are a first and a second detection circuits for converting electric charges detected and input by the first and the second detecting electrodes into voltages corresponding to a magnitude of the angular rate, and numerals 9 and 10 are a first and a second output terminals for signals of the angular rate sensor, provided in the first and the second detection circuits.

The angular rate sensor element block 1a is composed of the tuning fork vibrator 1 the electrodes 2a, 2b and 3 formed on the tuning fork vibrator 1, and the first detecting electrode 4 and the second detecting electrode 5 formed on the tuning fork vibrator 1. A reference numeral 11 designates a first amplifier, numeral 12 a second rectifier, numeral 13 a smoothing circuit, numeral 14 a variable gain amplifier, numerals 15a and 15b a second amplifier and a third amplifier, numerals 16a and 16b a fourth amplifier and a fifth amplifier, numerals 17a and 17b a first phase shifting circuit and a second phase shifting circuit, numerals 18a and 18b a first phase detector and a second phase detector, numeral 19 a comparator for detecting a vibration timing of the tuning fork vibrator 1, numerals 20a and 20b a first low-pass filter and a second low-pass filter, numerals 21a and 21b a first adjustment means and a second adjustment means, numerals 21c and 21f a first DC amplifier and a second DC amplifier, numerals 21d and 21g a first amplification factor adjusting resistor and a second amplification factor adjusting resistor, and numerals 21e and 21h a first offset adjusting unit and a second offset adjusting unit.

The driving circuit 6 comprises the first amplifier 11 for taking as an input an electric charge generated in the electrode 3 formed on the tuning fork vibrator 1 to constitute the means of detecting vibration level, the rectifier 12 for rectifying an output voltage of the first amplifier 11, the smoothing circuit 13 for smoothing all output voltage of the rectifier 12, the variable gain amplifier 14 for taking as an input an output voltage of the first amplifier 11 and for varying an amplification factor according to an output voltage of the smoothing circuit 13, the second amplifier 15a for amplifying an output voltage of the variable gain amplifier 14, and the third amplifier 15b for producing an output of a reverse phase to the second amplifier 15a.

The first amplifier 11 is called an I–V converter, or a current amplifier, for converting an electric charge input thereto into a voltage, and it comprises an operational amplifier and a feedback resistor. This structure operates in a manner that an input terminal always remains at 0 volt, for which an expression that "an input is imaginary shorted" is used. This is a useful circuit means, in the case of the driving circuit 6 which deals with a weak signal and processes the signal requiring no shift in phase as it performs a synchronous detection, because influences of a capacitive component of the electrode 3, a capacitance, an inductance, and the like of a wiring through the driving circuit 6 can be precluded, even if they are involved, as an effect of it that the input voltage is maintained to be zero at all the time. The rectifier 12 and the smoothing circuit 13 compose a circuit to change a magnitude of an electric charge produced in the electrode 3 into a DC voltage, and the voltage obtained here represents a vibration level of the tuning fork vibrator 1. The variable gain amplifier 14 inputs an output of the first amplifier 11 as well as all output of the smoothing circuit 13, and amplifies the output signal of the first amplifier 11 large, if the output voltage of the smoothing circuit 13 is small (when vibration of the tuning fork vibrator 1 is small), and reduces its amplification factor, on the contrary, if the output of the smoothing circuit 13 is large (when the vibration level of the tuning fork vibrator 1 is large). Vibration of the tuning fork vibrator 1 can be kept constant by the variable gain amplifier 14. Furthermore, it is safe to say that the operation is carried out in a manner that the output of the smoothing circuit 13 becomes constant, taking into account a change in efficiency of the electrode 3, if the change occurs due to a change in temperature, etc. These circuits are important in order to keep a sensitivity of the angular rate sensor constant, since the Coriolis' force generated in the tuning fork vibrator 1, expressed by Fc=2 mvΩ, is directly proportional to a vibrating velocity "v".

The first and the second detection circuits 7 and 8 respectively comprise the fourth amplifier 16a and the fifth amplifier 16b for taking electric charges produced in the first detecting electrode 4 and the second detecting electrode 5 as their inputs, and outputting voltages proportional to amounts of these electric charges, the first phase shifting circuit 17a and the second phase shifting circuit 17b for shifting phase of the output voltages of the fourth amplifier 16a and the fifth amplifier 16b by 90 degrees, the first phase detector and the second phase detector, 18a and 18b, for carrying out phase detection with a timing signal output by the comparator 19 for detecting a vibration timing of the tuning fork vibrator 1, and the first adjustment means and the second adjustment means, 21a and 21b, for DC-amplifying output voltages that appear after output signals of these phase detectors 18a and 18b pass through the first low-pass filter and the second lowpass filter 20a and 20b. Furthermore, the first adjustment means and the second adjustment means respectively include the first DC amplifier and the second DC amplifier, 21c and 21f, the first amplification factor adjusting resistor and the second amplification factor adjusting resistor, 21d and 21g, and the first offset adjusting unit and the second offset adjusting unit, 21e and 21h, for independently adjusting their amplification factors, offsets and temperature dependency of the offsets.

Figure 3:
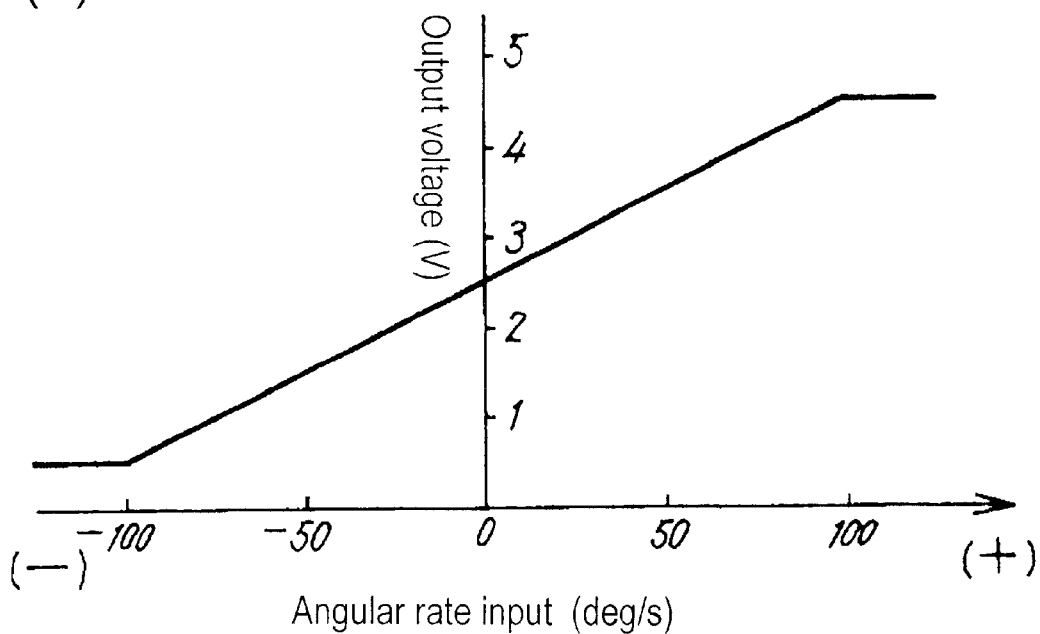
FIGS. 3(a) and 3(b) are graphical representations showing input-output characteristics in the same first exemplary embodiment.
Figure 3:
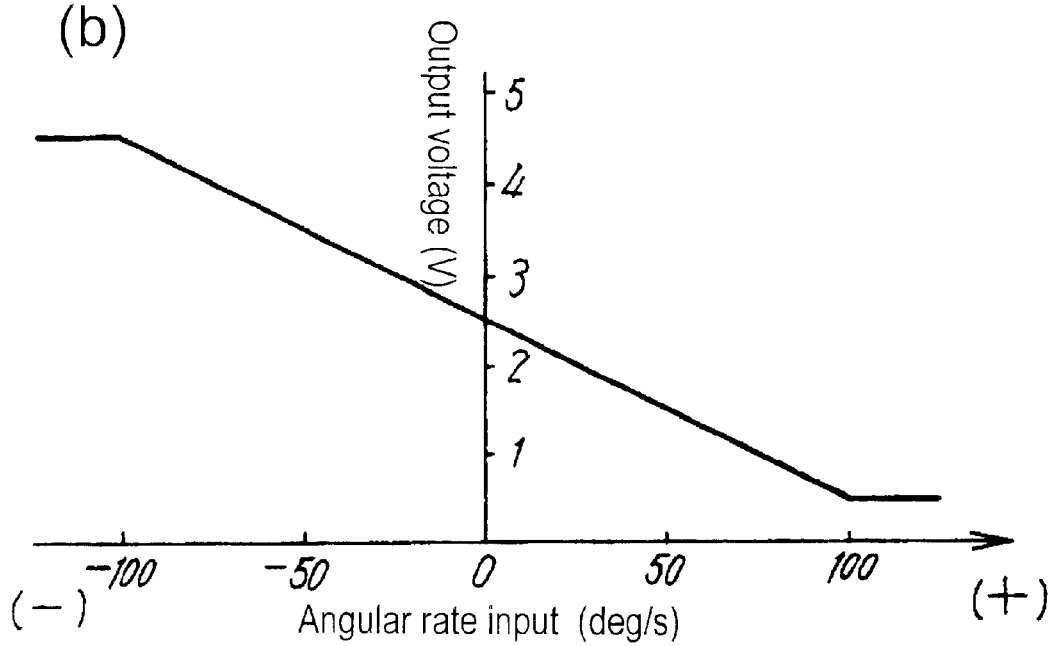

The tuning fork vibrator 1 keeps vibrating at all the time, as driving signals are sent to the electrodes 2a and 2b respectively by the second amplifier 15a and the third amplifier 15b of the driving circuit 6. When a rotational angular rate is impressed upon this tuning fork vibrator 1, electric charges generated by the Coriolis' force are detected by the first detecting electrode 4 and the second detecting electrode 5. Outputs shown in FIG. 3(a) and FIG. 3(b) are obtained respectively from the first and the second output terminals 9 and 10 of the first and the second detection circuits 7 and 8, since the first detecting electrode 4 and the second detecting electrode 5 are arranged in such a manner as to obtain electric charges of reverse polarity with respect to each other. It is therefore possible to detect an abnormal condition by way of observing the voltages of the first and the second output terminals 9 and 10 at all the time, even when an abnormality occurs with any of the first detecting electrode 4, the second detecting electrode 5, the first detection circuit 7, the second detection circuit 8, and their wiring. In addition, the output voltage increases when an angular rate input is (+) (a clockwise rotation is defined as positive), and the output voltage decreases when the angular rate input is (−), as in FIG. 3(a). It is apparent from the figure that a sensitivity characteristic gained from the output terminal 9 is +20 mV/deg/sec. In FIG. 3(b), on the other hand, the output voltage decreases when the angular rate input is (+), and the output voltage increases when the angular rate input is (−). It is also obvious from the figure that the sensitivity characteristic gained from the output terminal 10 is −20 mV/deg/sec.

Second Exemplary Embodiment

Figure 4:
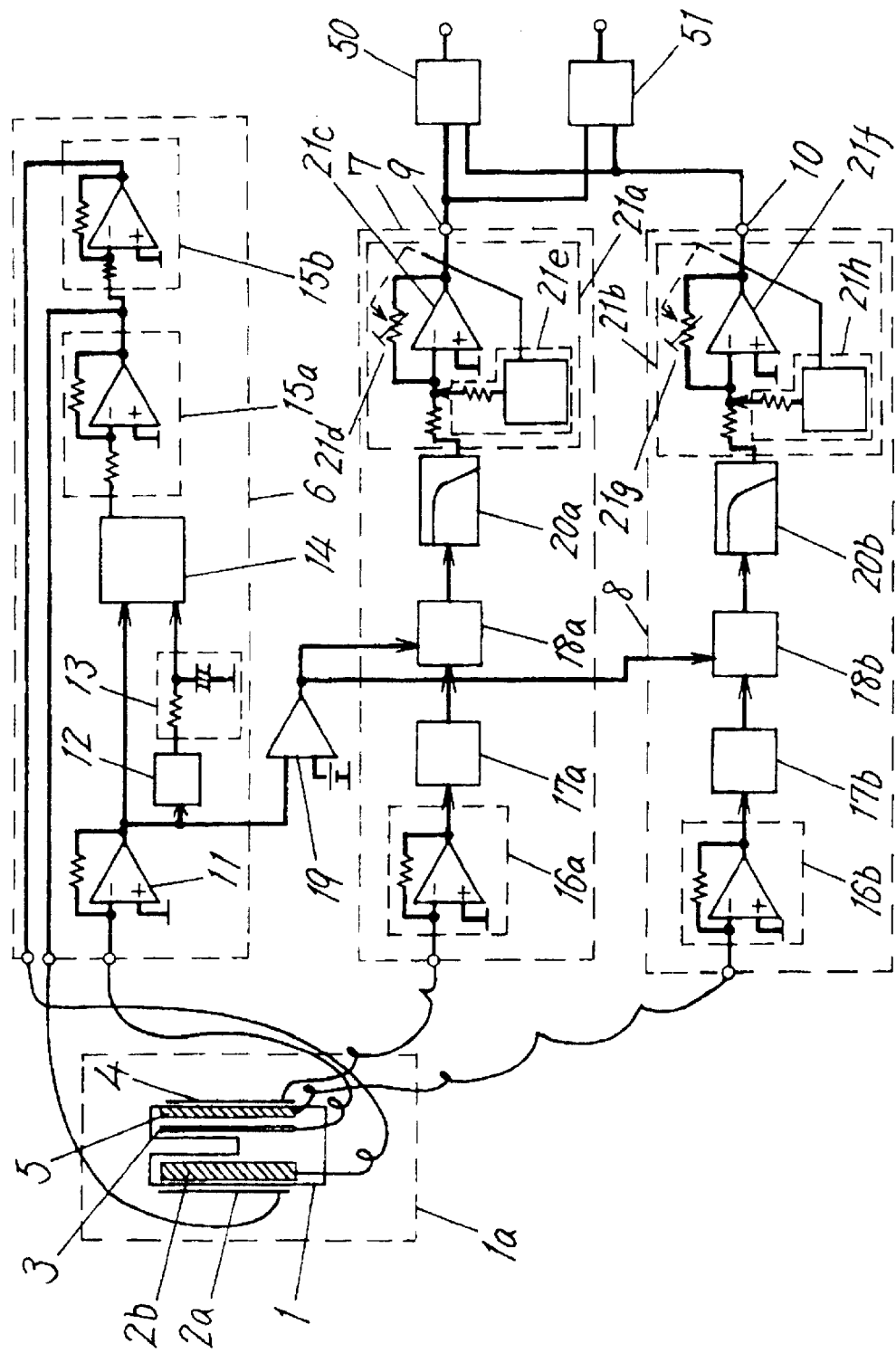
FIG. 4 is a block diagram of an angular rate sensor of a second exemplary embodiment of the present invention.

FIG. 4 is a block diagram of an angular rate sensor of a second exemplary embodiment of this invention. In FIG. 4, same structural components as those of FIG. 1 are referred to by the same numerals and the detailed description will be omitted, whereas only different components will be described in detail. In FIG. 4, a reference numeral 50 designates a differential operation means, and a numeral 51 designates a comparator means.

There is composed of the differential operation means 50 for performing a subtractive operation between an output voltage from a first output terminal 9 provided in a first detection circuit 7 and an output voltage from a second output terminal 10 provided in a second detection circuit 8. A practical sensitivity of 40 mV/deg/sec is gained from the differential operation means 50. Therefore, twice as large the output sensitivity is attained as compared to the output sensitivity gained only from one side. Furthermore, it is possible to double a dynamic range within an input range of detecting an angular rate, if the sensitivity is adjusted to the ordinary level (the output level only from one side).

In addition, there is composed of the comparator means 51 for performing an additive operation of a voltage derived by subtracting the reference voltage of 2.5V from the output voltage of the first output terminal 9 and another voltage derived by subtracting the reference voltage of 2.5V from the output voltage of the second output terminal 10.

According to this structure, an output voltage of 2.5V is obtained at both the first output terminal 9 and the second output terminal 10, when an angular rate input is zero, thereby gaining an output signal of zero for both of them, when subtractive operations are made for differences from a reference voltage of 2.5V. Naturally, ail additive operation of these output signals results in zero. Since the comparator means 51 performs an additive operation of a voltage derived by subtracting the reference voltage of 2.5V from the output voltage of the first output terminal 9 and another voltage derived by subtracting the reference voltage of 2.5V from the output voltage of the second output terminal 10, it is capable of detecting even a slight abnormality of every modes such as an abnormality with a first detecting electrode 4 or a second detecting electrode 5, an open or a short circuiting of wiring, a failure of the first detection circuit 7 or the second detection circuit 8, and so on.

Third Exemplary Embodiment

Figure 5:
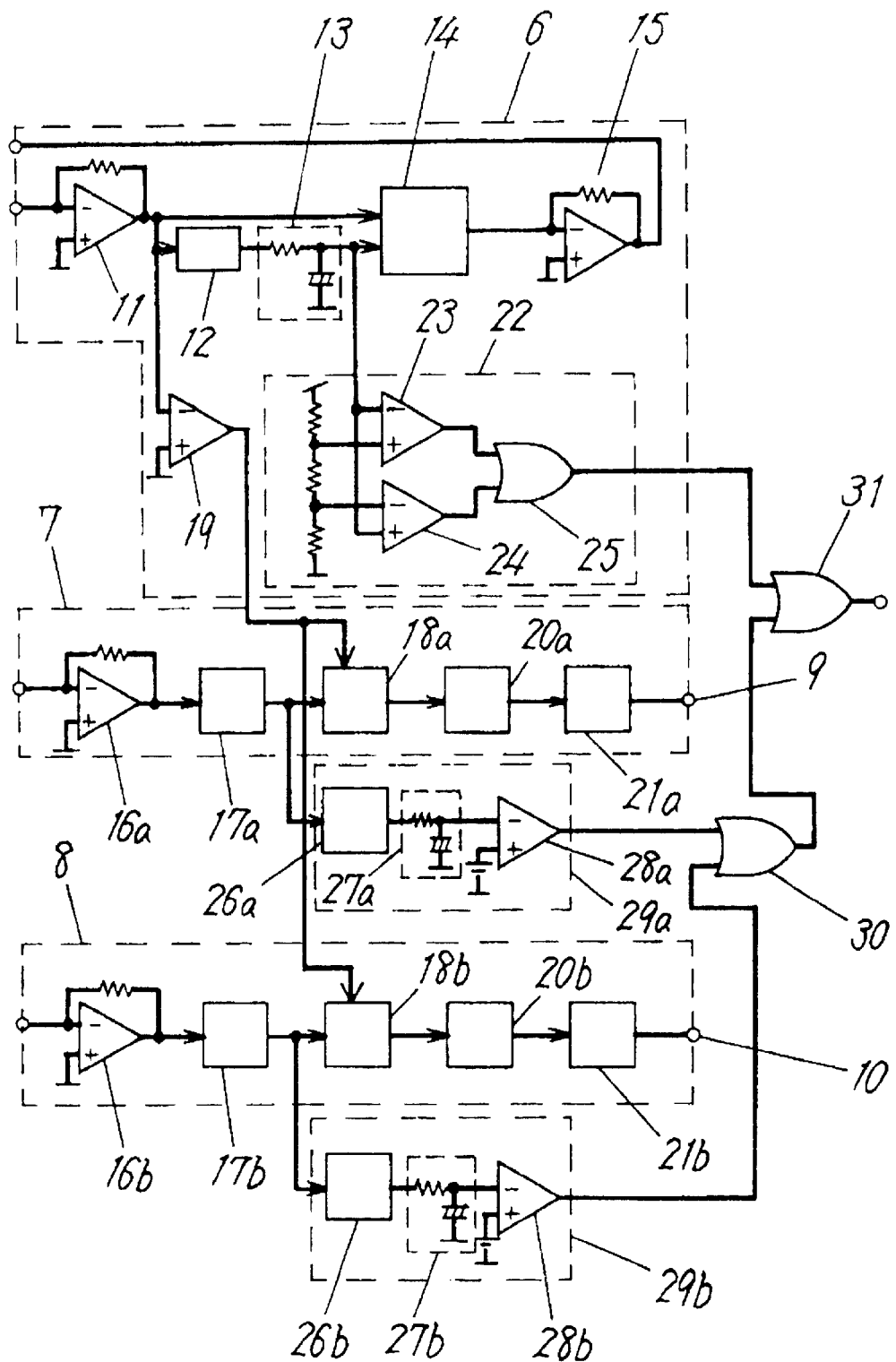
FIG. 5 is a block diagram of an angular rate sensor of a third exemplary embodiment of the present invention.

FIG. 5 is a block diagram of an angular rate sensor of a third exemplary embodiment of this invention. In FIG. 5, same structural components as those of FIG. 1 are referred to by the same numerals and the detailed description will be omitted, whereas only different components will be described in detail.

In FIG. 5, a reference numeral 22 designates a first level judgment circuit comprising comparators 23 and 24, and an OR gate 25. The comparators 23 and 24 are given as an input an output voltage of a smoothing circuit 13, and the OR gate 25 outputs a signal in either of cases when this voltage becomes lower than a prescribed voltage range, or when it becomes larger than the prescribed voltage range. In other words, it outputs a warning when a vibration level of a tuning fork vibrator 1 exceeds a prescribed range (when, for instance, a heavy impact is applied externally, the vibration is obstructed by something hitting the tuning fork vibrator 1, and so on). The first level judgment circuit 22 also outputs a warning when the vibration level of the tuning fork vibrator 1 does not reach a prescribed level immediately after a power supply is turned on.

A second and a third level judgment circuits 29a and 29b are respectively composed of detection circuits 26a and 26b, smoothing circuits 27a and 27b, and comparators 28a and 28b, wherein detected signals from the first detecting electrode 4 and the second detecting electrode 5 are respectively detected by the detection circuits 26a and 26b, and they are judged of their levels by the comparators 28a and 28b after they are converted into DC voltages by the smoothing circuits 27a and 27b, thereby becoming capable of outputting them as abnormal signals from the comparator 28a or 28b, if abnormal signals are produced in the first detecting electrode 4 and the second detecting electrode 5 due to a mechanical impact and the like. If the abnormal signal is output by either of the comparators 28a and 28b, it is output from an OR gate 30. In addition, if there is an output from either of the OR gate 25 and the OR gate 30, it is output from another OR gate 31.

A comprehensive diagnosis of the angular rate sensor can be realized accordingly.

Fourth Exemplary Embodiment

Figure 6:
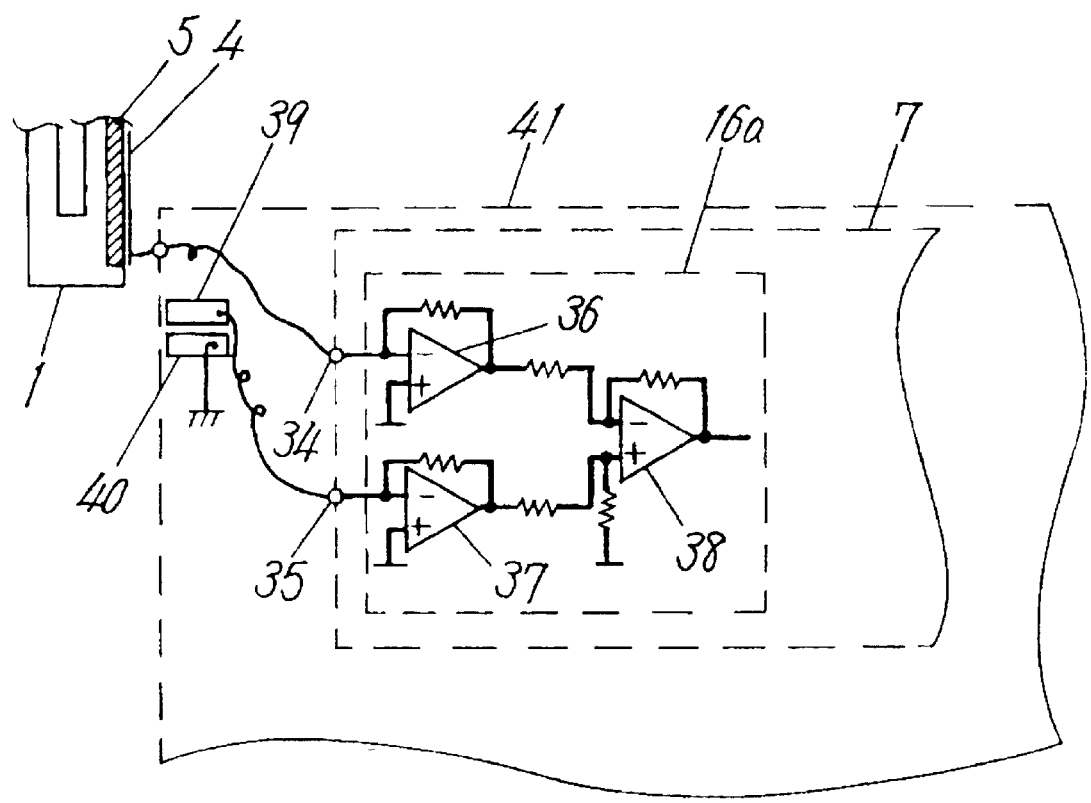
FIG. 6 is a block diagram of an angular rate sensor of a fourth exemplary embodiment of the present invention.

FIG. 6 is a block diagram of an angular rate sensor of a fourth exemplary embodiment of this invention. In FIG. 6, same structural components as those of FIG. 1 are referred to by the same numerals and the detailed description will be omitted, whereas only different components will be described in detail.

In FIG. 6, a fourth amplifier 16a in a first detection circuit 7 is composed of operational amplifiers 36, 37 and 38, and a first detecting electrode 4 is connected to an input terminal 34 of the first detection circuit 7 via a wiring. In wiring patterns 39 and 40 formed adjacent to the wiring connected to the input terminal 34 on a substrate 41, the wiring pattern 40 is grounded, and the wiring pattern 39 is connected to an input terminal 35 of the first detection circuit 7. The input terminals 34 and 35 are connected respectively to negative inputs of the operational amplifiers 36 and 37, and a subtraction is made by the operational amplifiers 38 after conversion of an electric charge into a voltage. Because of the above structure, external disturbances may be input similarly into the input terminals 34 and 35. Diffraction due to inducement of voltages applied to electrodes 2a and 2b, diffraction due to electrostatic capacities in the wiring patterns, electromagnetic field from external radiation, and so on are thought to be examples of the external disturbances. Since their influences are input to the input terminals 34 and 35 in the like manner, they can be removed as synchronized signals by the operational amplifier 38. Besides the above, since every other structure of a fifth amplifier 16b in a second detection circuit 8, connection to a second detecting electrode 5, and so on are composed similarly, their details are omitted.

Industrial Applicability

According to the present invention, as described above, there is provided a duplexed system from detecting electrodes formed on a vibrator to detection circuits, so as to be capable of observing and comparing their respective output signals at all the time, thereby realizing an immediate judgement of an abnormality in the event a failure occurs in either of them.

Moreover, since output voltages of reverse polarity are obtainable with respect to an input angular rate, not only is it capable of gaining twice as great sensitivity by computing a difference between these output voltages, but also is possible to double a dynamic range within an input range of detecting the angular rate, when the sensitivity is set at the ordinary level.

Reference Numerals

1 Tuning fork vibrator
1a Angular rate sensor element block
2a and 2b Exciting electrode
3 Electrode for detecting a vibration level
4 First detecting electrode
5 Second detecting electrode
6 Driving circuit
7 First detection circuit
8 Second detection circuit
9 First output terminal
10 Second output terminal
11 First amplifier
12 Rectifier
13 Smoothing circuit
14 Variable gain amplifier
15a Second amplifier
15b Third amplifier
16a Fourth amplifier
16b Fifth amplifier
17a First phase shifting circuit
17b Second phase shifting circuit
18a First phase detector
18b Second phase detector
19, 23, 24, 28a and 28b Comparator
20a First low-pass filter
20b Second low-pass filter
21a First adjustment means
21b Second adjustment means
21c First DC amplifier
21f Second DC amplifier
21d First amplification factor adjusting resistor
21g Second amplification factor adjusting resistor
21e First offset adjusting unit
21h Second offset adjusting unit
22 First level judgment circuit
25, 30, and 31 OR gate
26a and 26b Detection circuit
27a and 27b Smoothing circuit
29a Second level judgment circuit
29b Third level judgment circuit
34 and 35 Input terminal
36, 37, and 38 Operational amplifier
39 and 40 Wiring pattern
41 Substrate
50 Differential operation means
51 Comparator means

What is claimed is:

1. An angular rate sensor comprising:

an exciting unit for providing a vibrator with vibration;

a means for detecting a signal of a vibration level of said vibrator;

a first detection means for detecting a Coriolis' force generated responsive to an angular rate;

a second detection means for detecting a signal of reverse polarity to that of said first detection means;

a driving circuit for taking a signal from said means of detecting vibration level as an input, and outputting a signal to said exciting unit;

a first detection circuit wherein detected signals are being input from said first detection means; and a second detection circuit wherein detected signals are being input from said second detection means, wherein an abnormal condition of said angular rate sensor being detectable from outputs of said first and second detection means, wherein said driving circuit comprises:

a first amplifier for taking as an input an electric charge generated in said means of detecting vibration level;

a rectifier for rectifying an output voltage of said first amplifier;

a smoothing circuit for smoothing an output voltage of said rectifier;

a variable gain amplifier for taking as an input an output voltage of said first amplifier, wherein an amplification factor varies according to an output voltage of said smoothing circuit;

a second amplifier for amplifying an output voltage of said variable gain amplifier; and a third amplifier for producing an output of a phase reverse to said second amplifier, and further wherein said first detection circuit and said second detection circuit respectively comprise:

a fourth amplifier and a fifth amplifier for taking as input electric charges produced in said first detection means and said second detection means, and outputting voltages proportional to amounts of these input electric charges;

a first phase detector and a second phase detector for carrying out phase detection with a timing signal in the output signal of said first amplifier, after shifting phases of the output voltages of said fourth amplifier and said fifth amplifier respectively by 90 degrees, or another first phase detector and another second phase detector for carrying out phase detection of the output voltages of said fourth amplifier and said fifth amplifier respectively with a timing signal derived by shifting a phase of the output signal of said first amplifier by 90 degrees;

a first low pass filter and a second low pass filter for smoothing output signals of said first phase detector and said second phase detector respectively; and a first adjustment means and a second adjustment means for DC-amplifying output voltages of said first low pass filter and said second low pass filter, said first and second adjustment means having functions of amplification factor adjustment, offset adjustment and temperature adjustment for the offset.

2. An angular rate sensor comprising:

an exciting unit for providing a vibrator with vibration;

a means for detecting a signal of a vibration level of said vibrator;

a first detection means for detecting a Coriolis' force generated responsive to an angular rate;

a second detection means for detecting a signal of reverse polarity to that of said first detection means;

a driving circuit for taking a signal from said means of detecting vibration level as an input, and outputting a signal to said exciting unit;

a first detection circuit wherein detected signals are being input from said first detection means, and a second detection circuit wherein detected signals are being input from said second detection means, wherein an abnormal condition of said angular rate sensor being detectable from outputs of said first and second detection means, wherein:

said driving circuit has a first level judgment circuit for judging abnormality of a signal from said means of detecting vibration level; and said first detection circuit and said second detection circuit respectively have a second level judgment circuit and a third level judgment circuit for judging abnormality of the detected signals from said first detection means and said second detection means, and said angular rate sensor further comprises an output means for generating an output when any of said first level judgment circuit, said second level judgment circuit and said third level judgment circuit outputs a signal signifying a judgement of abnormality.

3. The angular rate sensor according to claim 1, wherein:

said fourth amplifier and said fifth amplifier have a first input terminal and a second input terminal for receiving respective inputs of the detected signals from said first detection means and said second detection means; and a third input terminal and a fourth input terminal for receiving inputs of signals from a first wiring and a second wiring, whereto same signals as influences received by the respective detected signals from said first detection means and said second detection means are impressed, and wherein said angular rate sensor further comprises a first amplifier for differentially amplifying the signal from said first input terminal and the signal from said third input terminal, and a second amplifier for differentially amplifying the signal from said second input terminal and the signal from said fourth input terminal.

* * * * *

UNITED STATES PATENT AND TRADEMARK OFFICE
CERTIFICATE OF CORRECTION

| | | |
|---|---|---|
| PATENT NO. | : 6,584,841 B1 | Page 1 of 1 |
| APPLICATION NO. | : 09/554014 | |
| DATED | : July 1, 2003 | |
| INVENTOR(S) | : Toshihiko Ichinose et al. | |

It is certified that error appears in the above-identified patent and that said Letters Patent is hereby corrected as shown below:

<u>Column 8</u>
Line 50, after "first" add -- differential --

<u>Column 8</u>
Line 53, after "second" add -- differential --

Signed and Sealed this

Fourth Day of September, 2007

JON W. DUDAS
*Director of the United States Patent and Trademark Office*